United States Patent [19]

Spees

[11] E Re. 30,396

[45] Reissued Sep. 9, 1980

[54] FILING SYSTEM AND ELEMENTS THEREFOR

[76] Inventor: Arthur T. Spees, 14802 Ridgeboro Pl., Tustin, Calif. 92680

[21] Appl. No.: 843,757

[22] Filed: Oct. 20, 1977

Related U.S. Patent Documents

Reissue of:

[64] Patent No.: 3,913,250
Issued: Oct. 21, 1975
Appl. No.: 296,020
Filed: Oct. 10, 1972

U.S. Applications:

[63] Continuation-in-part of Ser. No. 883,113, Dec. 8, 1969, Pat. No. 3,785,520, which is a continuation-in-part of Ser. No. 612,202, Jan. 27, 1967, abandoned, which is a continuation-in-part of Ser. No. 328,798, Dec. 9, 1963, Pat. No. 3,301,263.

[51] Int. Cl.[2] ..... B42F 17/00
[52] U.S. Cl. ..... 40/380; 40/372
[58] Field of Search ..... 40/380–384, 40/360, 379, 359, 372

[56] References Cited

U.S. PATENT DOCUMENTS

| | | | |
|---|---|---|---|
| 834,294 | 10/1906 | Gremple | 40/380 |
| 1,053,009 | 2/1913 | Carver | 40/380 |
| 1,250,568 | 12/1917 | Dayton | 40/380 |
| 1,835,678 | 12/1931 | Strassel | 40/78 |
| 1,918,765 | 7/1933 | Lombardini | 40/380 X |
| 2,226,519 | 12/1940 | Larsen | 402/70 |
| 2,371,713 | 3/1945 | Short | 40/360 |
| 2,586,039 | 2/1952 | Heggedal | 40/594 |
| 2,630,219 | 3/1953 | Pierce | 40/78.13 |
| 2,687,732 | 8/1954 | Wassell | 40/78.13 |
| 2,954,032 | 9/1960 | Dahl, Sr. | 40/105.5 |
| 3,301,263 | 1/1967 | Spees | 40/380 |
| 3,465,460 | 9/1969 | Dahl, Jr. | 40/372 |

*Primary Examiner*—John F. Pitrelli
*Attorney, Agent, or Firm*—Knobbe, Martens, Olson, Hubbard & Bear

[57] ABSTRACT

[A filing system for the compact filing of information having a file container with a plurality of backing cards in said container. Cooperating between said file cards are fulcrum means positioned near the bottom edges of said backing cards and with support means for supporting the backing cards adjacent a fulcrum means, the parts being so arranged as to permit selected backing cards normally supported in a substantially vertical position to be separated or fanned apart at their top edges so that information on the upper portions of said backing cards may be accessible upon a limited number of cards. Also positioned between the backing cards are data cards which are supported by a data card support positioned above the fulcrum means. Access may be had to the data cards upon "fanning" of a limited group of backing cards.] *A filing system for the compact filing of information and having a file receptacle containing a plurality of backing cards that are separated near their bottom edge by a plurality of fulcrums. The interaction of several of the cards at these fulcrums and at their lower edges causes a limited number of the card to be separated or fanned at their upper portions so that information thereon may be fully visible. Data element support members are also provided on the receptacle so that when backing cards separate the data elements, the data elements will not interfere with the fulcrum action by falling down between the backing cards. The receptacle and backing cards interengage to prohibit vertical movement of the backing cards relative to the receptacle during the fulcrum action. Data elements are held against rearwardly positioned backing cards to assure visibility of said data elements during said fulcrum action.*

19 Claims, 12 Drawing Figures

FILING SYSTEM AND ELEMENTS THEREFOR

Matter enclosed in heavy brackets [ ] appears in the original patent but forms no part of this reissue specification; matter printed in italics indicates the additions made by reissue.

This application is a continuation-in-part of my copending application Ser. No. 883,113, filed Dec. 8, 1969, now U.S. Pat. No. 3,785,520 which is a continuation-in-part of my application Ser. No. 612,202, filed Jan. 27, 1967, now abandoned said application being, in turn, a continuation-in-part of application Ser. No. 328,798, filed Dec. 9, 1963, now U.S. Pat. No. 3,301,263.

BACKGROUND OF THE INVENTION

1. Field of the Invention

This invention relates to filing systems and more particularly to visible indexing systems and elements thereof for the compact storage and high speed retrieval of data in the form of printed material, microfilm, microfiche and the like.

2. Discussion of the Prior Art

Various types of visibly indexed filing systems for the storage of printed material in the form of file cards and for the storage of information in the form of microfilm jackets and microfiche are known in the prior art. The basic objects of these systems typically involve the competing requirements of high density filing and rapid retrieval of information from the system. To achieve rapid retrieval of information, it is necessary to be able to expeditiously obtain full visibility of the title area of any individual file element within the system. This goal can, of course, be achieved by designing a system wherein the title area of each card in the system is at all times visible. An example of this type of system is the commonly found visible card file system in which the file cards are hinged in flat trays with from three-sixteenth inch to one-fourth inch of each individual file cards exposed by overlapping the elements within the trays. This type of system has the obvious disadvantage that only a rather limited number of file cards can be filed in a given linear space. For example, the typical hinged type visible file requires approximately 23 linear inches to file 69 standard file cards of the type here being considered. By comparison, my invention as described herein permits the filing of over 350 file cards in a tray having a length of 16 inches.

In the visible filing of the card form of microfilm or microfiche, which is one of the applications of the invention described herein, approximately one-half inch is required for display of the title area. One type of visible microfiche file utilizes paper panels in which offset pockets are formed to receive the microfiche film card. Visible display of 15 microfiche cards would therefore require $7\frac{1}{2}$ inches of space for title display. Visible microfiche panels of this type are usually $8\frac{1}{2} \times 11$ inches and are filed in notebooks. Alternately, they may be side-mounted around a central column to create a "tower."

Other visible microfiche files known in the prior art employ individual clear plastic jackets which are contained in multiple-ring binders. Here again, the visibility of each title is achieved by the offset filing of each fiche.

In each of the above-mentioned visible index files for card or microfilm forms, valuable linear file space must be set aside for title area display, and the total linear dimension of all titles must be searched with each reference to the file. Further, sequential or categoric indexing is extremely difficult and viewing is limited to one panel at a time.

One of the most successful vertical filing type of prior art systems is described in U.S. letters Pat. No. 3,301,263 issued to Arthur T. Spees, the present inventor.

Another type of prior art vertical filing system of which I am aware is a magnetic type system which is presently commercially available. In this magnetic type index filing system, thin steel wafers or shims are sandwiched between two pieces of paper which are sealed together to form the index cards. These cards, with the metal insert on both sides, react with permanent magnets located on each side of a file tray in such a manner as to cause individual cards to separate or fan apart wherever cards converge at opposing angles. The magnetic system achieves the compactness of vertical filing, but true or full visibility of individual cards is limited due to the lack of control over the separation of cards. In the reference area, where the "V" is created, for example, as many as 25 cards may be separated or fanned within a $3\frac{1}{2}$ inch span. The result is that only the very top edge of each card can actually be viewed; and since one-quarter inch is required for a one-line title and one-half inch for microfiche titles, the visible feature of the magnetic file is limited.

As will become apparent from the description of the invention which follows, the disadvantages of the previously described prior art systems are overcome due to the highly novel and unique design of the file elements and file receptacle of my invention.

The system of my invention not only allows extremely high density filing of fully protected file elements but, at the same time permits rapid information-retrieval. Rapid retrieval is made possible by a unique mechanical interaction among the file elements in the form of backing cards or divider cards (and hereinafter in this paragraph referred to as "backing cards") within the file, whereby the individual backing cards can be caused to separate or fan apart at their top portions when the backing cards converge at their bottom edges from opposing angles under slight pressure. This mechanical interaction, which will be described in detail hereinafter, basically involves providing an added thickness or fulcrum laterally across each backing card and below center vertically, usually near the bottom edge, which serves as a pivot axis around which the adjacent backing card in the file can rotate when the backing cards are held compactly together or slightly compressed at their bottom edges. To control this pivotal action the backing cards are provided with receptacle engaging means for positioning them in the file in such a manner that they are forced to pivot around the fulcrum when their lower edges are urged together. These engaging means permit the backing cards to move freely longitudinally, but eliminates relative vertical movement.

Prior art patents which represent the closest art known to applicant and which clearly demonstrate the novelty of applicant's invention as described and claimed herein are the following:

| Patentee | No. | Issue Date |
|---|---|---|
| Brower | 769,855 | Sept. 13, 1904 |
| Kouba | 1,073,248 | Sept. 16, 1913 |

-continued

| Patentee | No. | Issue Date |
|---|---|---|
| Gebser | 1,730,069 | Oct. 1, 1929 |
| Vance | 1,801,943 | Apr. 21, 1931 |
| Strassel | 1,835,678 | Dec. 8, 1931 |
| Herz | 1,931,224 | Oct. 17, 1933 |
| Copeland | 2,169,318 | Aug. 15, 1939 |
| Wurzburg | 2,171,105 | Aug. 29, 1939 |
| McDermott | 2,284,586 | May 26, 1942 |
| Jonas | 2,329,201 | Sept. 14, 1943 |
| Short | 2,371,713 | Mar. 20, 1945 |

SUMMARY OF THE INVENTION

It is an object of the invention to provide a unique visual index filing system in which vertically filed, generally planar file elements such as individual backing cards or dividers cards, can be compactly filed within a novel file container and can expeditiously be caused to precisely separate or fan apart as a result of mechanical interaction among adjacent backing cards to provide complete visibility of the title area of any selected group of backing cards. The term "file element" as used in this application is a broad term and includes the parts herein referred to as the backing card or "divider card", as well as any mechanical equivalent thereof.

It is another object of the invention to provide a novel file element adapted for use with similar file elements in a file container or receptacle providing means for supporting the group of file elements in lateral alignment one behind the other, in which the file element includes receptacle engaging surfaces for pivotally supporting the file element within the receptacle in substantial vertical alignment with adjacent file elements and in which the file element is provided with an outwardly protruding, laterally extending fulcrum or pivotal axis adapted to cooperatively engage the next adjacent file element in a manner so as to urge pivotal movement of the adjacent file element about the fulcrum when the file elements are caused to converge at their lower extremities from opposing angles when held compactly together or under slight pressure.

It is another object of the invention to provide a novel filing system of the aforementioned character in which the file elements are provided with file container engaging surfaces in the form of locking notches disposed near the bottom of the side portions of each file element so as to permit the file elements to freely pivot on supporting members in the form of locking strips disposed adjacent the base of the file container or tray. Each file element is also provided with a laterally extending fulcrumlike protrusion or series of protuberances positioned so as to pivotally engage the next adjacent file element in the container. The novel mechanical interaction between the adjacent file elements and between each file element and the locking strips of the tray permits the elements to be freely moved longitudinally of the container and also at the touch of a finger to be fanned apart at the desired section of the file to expose to view the face of a desired single file element in the file and holds the filing elements in position on the locking strip prohibiting vertical movement during operation or falling out of the file accidentally and yet permits the easy removal of the elements from the file.

It is another object of the invention to provide a novel filing system as described in the preceding paragraphs in which there is provided a front panel adapted to be disposed either vertically or at an angle and a cooperating back panel which may be positioned longitudinally within the file container either vertically or at an angle. With the front and back panel located in its normal vertical orientation within the tray and the back panel correctly positioned longitudinally of the tray, the file elements within the file container are compactly held in an erect evenly spaced relationship.

It is still another object of the invention to provide a novel filing system of the aforementioned character in which the novel file elements are provided with a fulcrum or pivotal axis in the form of alternating patterns of pivoting embossments or protuberances arranged so that when the front and back panels are set at an angle relative to the normal vertical storage orientation of the file elements, the pivoting embossments work together with the pivoting embossments of the adjacent file element to permit the file elements to be effortlessly fanned apart to form a V-shaped opening. Because of the unique configuration and arrangement of the pivoting embossments and the supporting surfaces or locking notches, the file elements will remain fanned apart to mark the spot for refiling of the file material if it is removed from the container.

It is another object of my invention to provide a filing system of the character described in which the file elements or backing cards are spaced apart a distance to provide a space to receive data elements such as data cards therebetween which are accessible when the backing cards are fanned. My invention includes means for supporting the data cards immediately above the fulcrum means of the backing cards to prevent the low portion of the data cards from moving into the fulcrum area. The term "data element" is a generic term which refers to a data card, microfilm, microfiche, envelope, or the mechanical equivalent thereof.

Another object of the invention is to provide a filing system as previously discussed in which the file elements are resiliently flexible and in which the pivoting embossments or protuberances thereon are configured and arranged so that when a group of file elements is in position within the file tray, there is a spring-like action between adjacent elements which encourages the fanning action or pivotal movement of the elements about the locking strips, and which also permits varying to some degree the number of elements or data elements within the file tray without substantially affecting the fanning action.

Still another object of the invention is to provide a filing system of the class described in which the file elements are resiliently flexible and are provided with spacing means in the form of protuberances arranged in alternating patterns so that when a group of file elements is in position within the file and the front and rear panels are in the vertical position, the file elements are evenly spaced.

A further object of the invention is to provide a filing system in which the file elements are so spaced that portions of the front face adjacent the upper edge thereof are visible and thus a file element can be identified by suitable indicia thereon. In this connection, it is an object to provide a system wherein the file elements are evenly spaced in a manner to allow the use of lines or other indicia printed on the front face of the file elements adjacent the top edge to be clearly visible across the top of the group of file elements, thereby permitting the file elements to be related visually to information, schedules or indicia provided at the front, at the back or intermediate the file.

Another object of the invention is to provide a filing system wherein the construction of the file elements and the file receptacle is such as to result in minimum surface friction between the file elements and the receptacle during operation or movement of the file elements longitudinally of the receptacle or tray.

In summary, these and other objects on my invention are achieved by a novel filing system comprising a file element receptacle for housing a group of generally planar file elements in alignment one behind the other, a plurality of file elements within the receptacle each having a planar body, receptacle engaging means for supporting the element within the receptacle and fulcrum means adapted to cooperatively engage the next adjustment file in a manner so as to urge pivotal movement of said adjacent element about the fulcrum when the file elements are caused to converge at their lower edges and supporting surfaces extending longitudinally of the receptacle for supporting the file elements within the receptacle in substantial vertical alignment.

DESCRIPTION OF THE PREFERRED EMBODIMENTS

Figure 6:
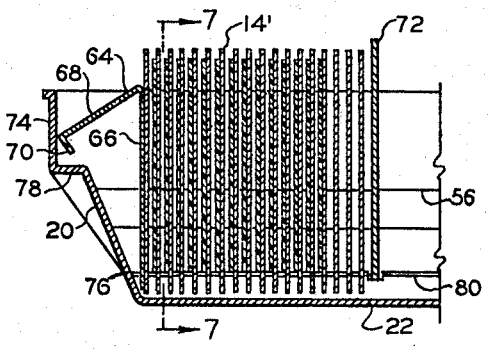
FIG. 6 is a foreshortened elevational cross-sectional view of the forward portion of the system in a storage mode with the file elements in an upright position within the file.
Figure 7:
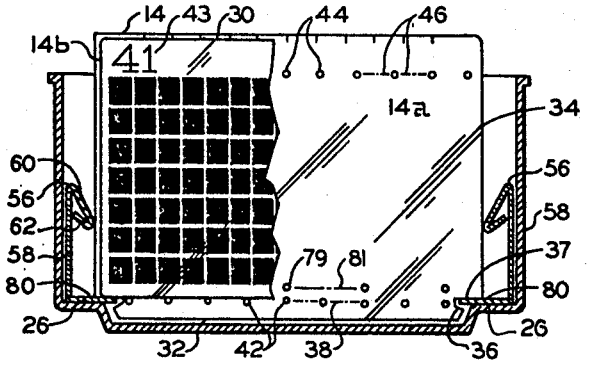
FIG. 7 is a view taken along lines 7—7 of FIG. 6.

Referring now to the drawings and more particularly to FIGS. 1, 2, 6 and 7, the numeral 12 generally designates a file container or receptacle of box-like form for holding a plurality of file elements 14a. The container is shown as having longitudinal side walls 16, a rear wall 18, a front wall 20 and a bottom wall 22. A cover (not shown) may be provided if desired. As best seen in FIG. 7 in this embodiment of the invention, side walls 16 have an offset portion forming longitudinally extending, generally horizontal shelf-like portions 26. These shelf-like portions support a pair of locking members, the purpose of which will presently be described.

For purposes of illustration, the file elements 14a shown in FIGS. 1 through 7 of the drawings comprise file elements in the form of backing cards or dividers 14a adapted to support removable data elements 14b shown here as microfiche elements. Data may be imprinted directly on or embodied in the file element, or as shown in FIGS. 1 through 7, the data may be embodied in a separate data element or data card 14b which may be integral with or separable from the file element. For certain applications only the data element is typically removed from the file. For other applications the file elements 14a may be removed from the file.

Figure 3:
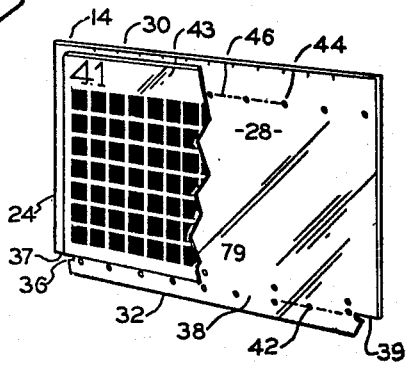
FIG. 3 is a perspective view of one form of file element of the invention comprising a file element in the form of a backing card or divider and a data element shown here as a sheet of film or microfiche which is partly broken away to illustrate the manner in which it is supported by the divider.

As illustrated in FIGS. 3 and 7, the file elements 14a have a planar body portion 28 and top, bottom and side portions 30, 32 and 34 respectively. I have found it preferable to construct them of a resiliently flexible material so that when the body portion is flexed and released it springs back to its original planar shape and has no tendency to take a set position. By way of example, I have found that plastics, such as [rigid] *semi-rigid* polyvinyl or polyester sheet material are particularly suitable for forming this type of file element.

As best seen in FIG. 7, in this embodiment of the invention the side portions 34 of the file elements 14a are offset near their bottom extremities to conform to the offset side walls of the container. Provided in the region of the offset are oppositely disposed receptacle engaging means, shown here in the form of notches 36 having surface means 37 interrupting the side portions 34 of the planar body. The notches 36 and the flange means 37 constitute a hold-down or lock-down means whereby the backing cards are held in position with the fulcrum [means] on the horizontally extending fulcrum line. The receptacle engaging means serves the purpose of pivotally supporting each file element within container 12 in substantial vertical alignment with adjacent file elements.

Figure 4:
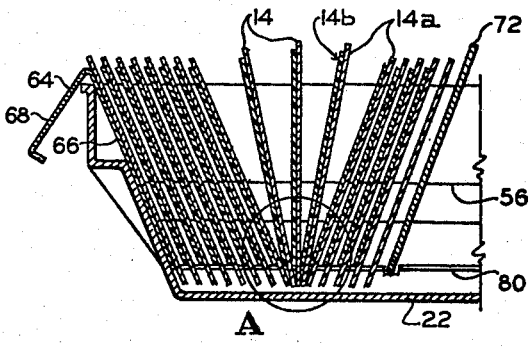
FIG. 4 is a foreshortened elevational cross-sectional view of the forward portion of the system in a data retrieval mode illustrating the file elements in a fanned apart configuration.
Figure 5:
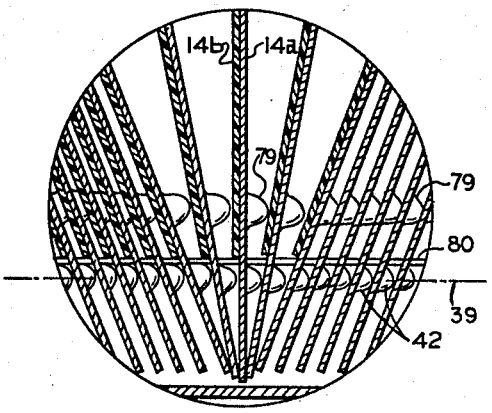
FIG. 5 is an enlarged view of area "A" of FIG. 4 showing the cooperative interaction between the file elements in a fanned apart configuration.
Figure 8:
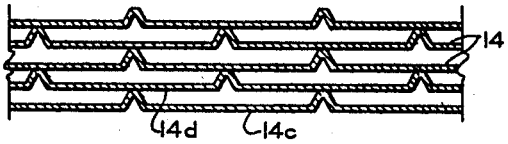
FIG. 8 is a plan view of a portion of a group of file elements shown here for purposes of illustration as planar backing cards as they appear in an upright, longitudinally relaxed orientation within the receptacle.
Figure 9:
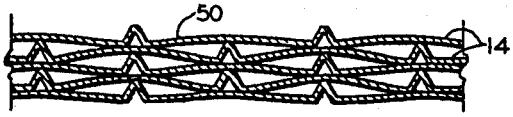
FIG. 9 is a plan view of a portion of a group of file elements in the form of planar backing cards as they appear in an upright storage orientation within the receptacle with the body of file elements placed under longitudinal compression.

Proximate the bottom edge 32 of each file element there is provided [fulcrum means] *protuberances* adapted to cooperatively engage the body portion of the adjacent file element within the group of file elements contained in the receptacle in a manner so as to urge pivotal movement of the adjacent file element about the fulcrum means when the file elements are caused to converge at an angle at their bottom edges, in the manner shown in FIGS. 4 and 5. The [fulcrum means protrudes] *protuberances extend* outwardly from the planar body of the file element and extends laterally thereof along a line 38 disposed generally parallel to and spaced apart from the bottom edge 32 of the file element. In this form of my invention, the fulcrum means is shown (FIG. 7) to comprise a plurality of protuberances 42 distributed in a substantially evenly spaced relationship along line 38 which is below the walls 37 from one side of planary body 28 to the other. The fulcrum [means] may take the form of protuberances formed by the addition of material to the file element, or they may be formed by embossing the file element in evenly spaced locations along line 38. When formed in the latter manner, as shown in FIGS. 8 and 9, different embossing patterns are used on adjacent file elements to eliminate nesting which would occur with a single aligned pattern. The [fulcrum means] *protuberances* of my invention cooperate between adjacent file cards 14a to space the file elements apart as shown so that removable data containing cards of data elements may be inserted between the file elements or backing cards 14a. The [fulcrum means] *protuberances* forms a fulcrum line for each backing card 14a and this line is positioned at or preferably slightly below the walls 37.

To accomplish the uniform spacing of the file elements within the receptacle, each file element is provided with spacing means shown here in the form of a plurality of protuberances 44 which are similar in configuration to the previously described protuberances 42. At least one row of protuberances 44 is provided on each file element body along a line substantially parallel to the lateral centerline 38 of protuberances 42 and spaced apart therefrom in a direction toward the top edge of the file elements. In the drawings (FIGS. 3 and 7) I show one row of spacing embossments evenly spaced along line 46. Additional rows of spacing protuberances may be provided for certain applications. While, for purposes of illustration, I only show nine spacing and pivoting protuberances on the file elements, the number in actual practice might be varied to achieve the desired compressive tension among file elements. Also in this connection in the drawings the size of the protuberances has been exaggerated to facilitate illustration. By way of example, when the file element consists of a card having a thickness of on the order of 0.010 inches, I have found that protuberances having a height of anywhere from two to five times the thickness of the card perform quite satisfactorily both as spacing and pivoting protuberances.

The protuberances themselves in the embodiment of the invention illustrated are formed in the body of the file element by embossing or the like, and thus a dimple is formed on the front face of each file element coincident with the protuberances on the rear face thereof.

As previously mentioned, adjacent file elements as positioned in the receptacle are provided with fulcrum and spacing protuberances or embossed patterns which do not register. Thus, referring to FIGS. 8 and 9, it will be seen that on the foremost file element, designated 14c and shown here for purposes of illustration in the form of a planar card, the embossed pattern is such that the protuberances are disposed intermediate those of the next adjacent card, designated 14d. It is only necessary to have two patterns and to arrange the cards alternately in the file to accomplish this, and the individual cards can readily be identified by a suitable marking or difference in shape, such as by having an upper corner portion alternatively square and rounded, or by otherwise coding the element.

Preferably, the embossed pattern is such that the protuberances of one file element are disposed substantially midway between the protuberances of the elements adjacent thereto as is apparent in the drawings. With this arrangement it is possible to achieve maximum compression of a group of the file elements as shown in FIG. 9, and when this is done the portions of each file element body between the individual protuberances are bent in tension to form arches 50 over the protuberances of the next adjacent file element and the entire group of compressed elements thus becomes spring loaded. Consequently, when the compressing force is released, the elements spring back to their original position, as shown in FIG. 8. It will be apparent that the size, number, position and spacing of the protuberances are factors upon which the tension of the individual file elements will depend when a group of file elements is compressed. In the form of the invention shown in the drawings the backing cards 14a are restrained from raising out of place in the container and there is contact along the fulcrum means. Contact along the fulcrum line combined with a lock-down means for preventing backing cards from being raised out of place contributes to the fanning action described in this application. A slight pressure between the file cards 14a and [their fulcrum means] *the protuberances* is desirable.

It will be noted that, by reason of the spacing of the file elements, the front surface of each element adjacent its upper edge is visible and consequently this area may be provided with indicia, such as vertical, laterally spaced lines or the like. In this way the elements can be related visually to information, schedules or indicia provided at the front, at the back or intermediate the file so as to expediate retrieval or information from the file.

Figure 12:
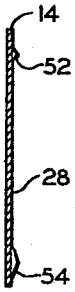
FIG. 12 is a view taken along lines 12—12 of FIG. 11 showing another form of file element construction.

In the construction thus far described I have shown an embossed pattern of what may be termed dimpled protuberances or projections; however, I contemplate that any means which will provide small protuberances on the surface of a file element may be used and it is not essential that the element be embossed. Also, other patterns or means for spacing the file elements may be used. For example, as illustrated in FIG. 12, the [fulcrum] *protuberances* means and file element spacing means may take the form of elongated rigid but yieldable elements such as strips of plastic material 52 and 54 which may be permanently or removably affixed to the body 28 of the file card element.

Referring now to FIG. 7, for the purpose of centering a group of file elements in the receptacle 12, which is of greater internal widths than the length of such elements, I provide a guide for centering means in the form of side guide elements 56 between the end edges of the elements 14a and each side of the receptacle or file. Each guide has a thin flat body 58 provided with a downwardly inclined section 60 at its upper edge and a terminal upwardly inclined section 62. The members may be metal or plastic but the material should have resiliency or spring quality. The side guides 56 serve to center and align the file elements, being so dimensioned as to be placed in slight compression by the body of the elements, designated 14' in FIG. 6. The downwardly inclined sections 60 serve to guide the file elements into place as they are inserted in the file.

A significant advantage of the side guides is that there is only minimum friction between the elements in the file and the side guides, and thus the file is easy to work with as an entire group of file elements can be moved back and forth with ease and without abrasion to the edges of the elements. The side guides are particularly helpful in certain types of visually indexed files where precise lateral alignment of the file elements is essential.

As best seen in FIG. 6, at the front of the container I provide a front panel 64 made of rigid sheet material and having a main planar body 66 provided with a forwardly extending downwardly inclined flange 68 at its upper edge terminating in a depending lip 70.

In FIGS. 4 and 6 I show diagrammatically how the panel member 64 is used in the system. FIG. 6 shows the normal storage position of the file container or receptacle and its contents with the front panel member 64 and the file elements upright. The body of file elements 14' is held compactly in position between the front panel member and an adjustable end plate or panel 72 which, if desired, may be adjustably positioned longitudinally of the file. In this form of my invention the front wall 20 of the receptacle 12 is provided with an upright portion 74 and a sloping portion 76 interconnected by a generally horizontally extending steplike element 78. With the file in storage mode, front panel member 64 is positioned within the container 12 so that depending flange 68 is in engagement with the inner wall of upper portion 74 of panel 20. In this position, with the front end rear panels in a vertical orientation the file elements are held generally vertically within the container. The walls engaging the group of cards constitute a means to position said backing cards and said fulcrum for holding the backing cards and [fulcrum means] *protuberances* to that the backing cards will pivot around the [fulcrum means] *protuberances* on the fulcrum line as pointed out herein.

Figure 1:
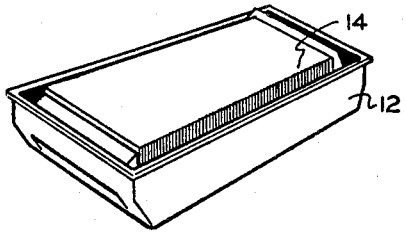
FIG. 1 is a perspective view of the filing system of the invention showing the file receptacle with file elements contained therein as they appear in a storage mode.
Figure 2:
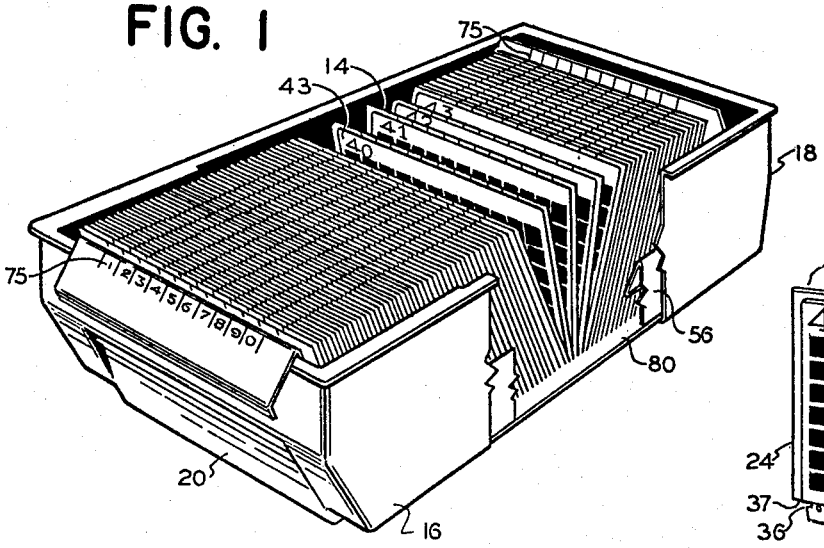
FIG. 2 is an enlarged perspective view of the filing system as it appears in a data retrieval mode.

FIGS. 2 and 4 illustrate how readily access may be gained to a selected part of the file so as to provide complete visibility of the title area 43 of any group of file elements. By moving the front panel 4 and rear panel 72 into the positions shown in FIG. 4, the forces tending to hold the file elements in vertical position are relieved and a first portion of the body of elements 14a can be tilted forwardly and a second body portion tilted rearwardly. This movement of the file elements at the area of interest within the file causes the file elements near the separation point between the first and second file element body portions to converge at their lower extremities from opposing angles. As best seen in FIG. 5, this convergence pressure near the bottom of each element causes the top of each file element within the group to pivot about the [fulcrum means] *protuberances*, in this case protuberances 42, of the next adjacent file element with the result that the file elements will smartly fan apart at their upper edges into the position shown in FIGS. 2, 4 and 5.

It is to be appreciated that various types of front and rear panels can be used to alternately hold the file elements vertically within the file container in the storage mode and permit them to separate during the retrieval mode. Also the front and rear panels may be eliminated and the file container may be designed with sloping front and rear walls to support the file elements within the file.

As shown in FIG. 2, the front and rear panel members can be inscribed with indicia 75 corresponding to indicia on the file elements or intermediate spacers to facilitate locating file elements of interest within the file.

In the embodiment of the invention shown in FIGS. 1–7, the file elements 14a are locked in the file by the cooperative interaction of the receptacle engaging means or opposing notches 36 and support means for supporting the file elements for pivotal movement relative to the side walls of the container. The support or locking means shown here is in the form of a pair of longitudinally extending locking strips or members 80 protruding inwardly from the side walls of the container a sufficient distance so as to extend into the notches 36 formed in the side portions of each planar body of the file elements. As shown in FIG. 7, members 80 are positioned within receptacle 12 so that the lower edge portions of the file elements are spaced apart from the bottom of the receptacle and can move freely relative thereto. With the construction illustrated, the lateral center line of the [fulcrum means or] protuberances 42 closely coincides with but is slightly below the lateral center line of the locking members as shown best in FIG. 5, and the file elements are caused to pivot freely thereabout. As shown best in enlarged FIG. 5, the data elements 14b rest on the member 80 and they are thereby prevented from slipping downward between the fulcrum protuberances and an adjacent card which would result in disturbing the functioning of the [fulcrum means] *protuberances* by changing the pressure of contact between the file elements or data cards and [fulcrum means] *protuberances*. Also, with the data element in this position the data element is always readily removable upon the fanning of the file elements. As will be seen from the foregoing, the member 80 comprises a support means for the file element or backing card, a hold-down means or locking means for the file element, and a means for supporting the data element so that it will not drop down to interfere with the [fulcrum means] *protuberances*. When the file elements are caused to converge at opposing angles at the base of the V formed at the selected location within the file between the first and second portions of the body of tile elements, they will precisely and expeditiously fan apart as illustrated in the drawings. It is to be noted that the locking members permit the file elements to move freely longitudinally of the container but substantially eliminate their vertical or lateral movement. The number of file elements which will be included in the group fanned apart within the V angle is a function of the thickness of the [fulcrum means] *protuberances* and its location relative to the bottom of the card. Therefore, by varying the thickness of the [fulcrum means] *protuberances* and the location of the [fulcrum means] *protuberances* relative to the bottom or convergence point of the file elements, the angle of the V and the number of dividers which will fan apart in the V can be accurately controlled.

As shown in FIGS. 1 through 7 of the drawings, the file element 14a is shown in the form of a backing card or divider card 14a. Placed in spaces provided between the backing cards are the removable data elements 14b in the form of a data card or microfilm. It is necessary to provide holding means for holding the data element in position against the file element when the file elements are fanned apart. As best seen in FIGS. 5 and 7, the holding means in this embodiment are provided in the form of a plurality of protuberances 79 formed on each file element 14a along a line 81 substantially parallel to and spaced apart from the lateral center [line 38] *lines 38 and 39, respectively,* of protuberances 42. As previously mentioned, data elements 14b rest upon locking strips 80 and, therefore, protuberances 79 are preferably located along a line parallel to and slightly above the plane of the locking strips so that they will engage the data elements near their lower edges and hold them firmly against the divider.

The protuberances 79 are larger than the protuberances 42 which form the fulcrum [means], and they, therefore, grip the lower edges of the data cards and hold them against the forward face of a rearward backing card. The protuberances 79 constitute spacer means and function to space the data elements spaced from the rearward surface of the forward positioned backing card, both when the backing cards are fanned and parallel.

When the data elements 14b are in the form of microfiche it is important that the spacing protuberances and the holding protuberances respectively be located along lines above and below the data bearing portions of the microfiche so as to avoid scratching or otherwise marring the film. Also with this form of data element, the height of the spacing protuberances is of necessity less than the height of the protuberances forming the fulcrum [means] so as to compensate for the thickness of the data element.

The file elements, once fanned apart as illustrated in FIGS. 2, 4 and 5, will remain in open position when an individual data element is removed. This clearly marks the exact spot for refiling of the element, thereby eliminating the need for a marker or "out card." Insertion and removal of file elements in the form of backing cards, divider cards, file cards, envelopes and the like, is readily accomplished by slightly bowing or bending the file element so as to foreshorten its width sufficiently to permit the element to be disengaged from the support means or locking strips.

Although in the form of the invention described in the preceding paragraphs the file elements are constrained to pivot about the support means or locking members 80, I have found that a similar fanning action can be achieved with a variety of support means-receptacle engaging means configurations. For example, the file elements can be be provided with receptacle engaging means in the form of fingers protruding outwardly from their side portions. In this embodiment the receptacle is provided with longitudinally extending finger receiving grooves or slots which pivotally support the file elements within the file. In another form of my invention, the file card elements rest on the bottom of the container with the lower edge of the elements forming the receptacle engaging means and the bottom of the receptacle forming the support means.

Figure 10:
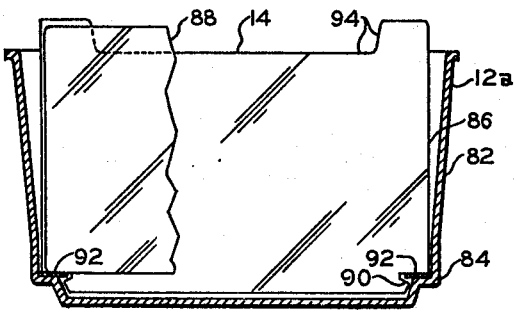
FIG. 10 is a transverse cross-sectional view of another form of my invention showing file elements and a file receptacle of slightly different construction.

Another form of my invention is illustrated in FIG. 10. In this embodiment the receptacle or file 12a is similarly provided with stepped side walls, here identified by the numeral 82, but the width of the container in the region of the stepped portion 84 is only slightly greater than the width of the file elements. The container is formed so that the side walls slope slightly outwardly from the stepped portion and thereby serve to guide the file elements into position within the container. With this construction the centering means or side guide elements can be eliminated, since the side walls of the container serve to enter the file elements therewithin.

For purposes of illustration, the file element 14 shown in FIG. 10 is of slightly different design and is shown in the form of a backing card or divider 86 adapted to support a data element 88. Divider 86, like previously described file elements is provided with notches 90 in its side portions which cooperate with locking strips 92 to hold the element in vertical alignment within the container. The divider shown also has a cut out portion 94 formed proximate its upper margin so as to expose to view the title area of the data element. This configuration of divider has the advantage of permitting easy removability of the data element while at the same time providing support to the upper corners of the element.

Figure 11:
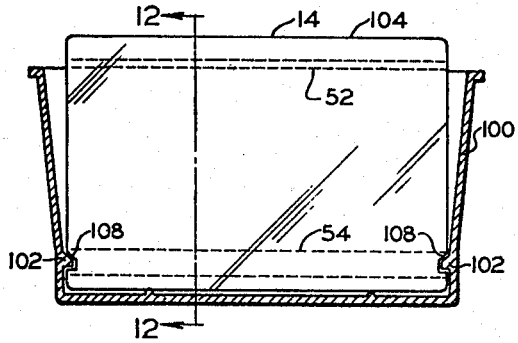
FIG. 11 is a transverse cross-sectional view of still another form of the invention.

FIG. 11 shows still another form of the invention in which the container side walls 100 slope directly outwardly from the bottom of the container. The stepped portions of the side walls have been eliminated in this form of the invention, and the side walls 100 are formed so as to include inwardly protruding support means shown here in the form of a pair of longitudinally extending rib portions 102 formed integrally with the side walls 100. The width of the file is such that the side walls in the region of the locking ribs 102 serve to center the file elements within the file, thereby eliminating the need for separate side guide members.

The file element 14a, illustrated in FIG. 11, is in the form of a notched backing card 104 adapted to display data imprinted on its face. The notches 108, which in this instance comprise the receptacle engaging means, are formed near the lower edge of the element and are shaped so as to cooperate with ribs 102 to hold the file element in vertical alignment within the container. In this embodiment, as in previously described embodiments, the file elements 14a pivot about the support means, in this case ribs 102.

As noted earlier, the [fulcrum means] *protuberances* and the spacer means, in the form of the invention shown in FIGS. 11 and 12, are of a slightly different configuration from those previously described. The fulcrum means is shown here as comprising a strip of yieldable plastic, paper or similar material 54 which can be permanently or removably affixed to the file element. The shape of element 54 is generally triangular in cross section so as to provide a pivotal axis about which the adjacent file element can pivot when the lower edges of the file elements are moved together in the manner previously described.

The spacing means is shown in this form of the invention as also comprising a strip of yieldable plastic, paper or like material 52 of generally triangular cross section which can be permanently or removably affixed to the file element.

Strips 52 and 54 can be formed integrally with the file element, can be separately constructed and permanently bonded to the file element, or they can be separately constructed and mechanically clipped to or otherwise removably affixed to the file element.

I claim:

[1. A filing system of the class described, the combination of:

a. a file receptacle having spaced apart longitudinal side walls for containing a group of backing cards positioned one behind the other;

b. a plurality of backing cards supported in said receptacle in side-by-side relationship, one behind the other and having substantially planar bodies and side, bottom and top edges;

c. fulcrum means positioned along a fulcrum line near the bottom edges of said backing cards and cooperatively engaging adjacent backing cards contained in said receptacle;

d. means in said receptacle operating to position said backing cards and said fulcrum means to cause relative pivotal movement of adjacent backing cards about said fulcrum line when a number of said backing cards are caused to converge at their bottom edges and thus cause fanning of a limited number of backing cards; and e. data element support means for supporting data elements which may be positioned between adjacent backing cards to prevent such data elements from movement into a position between said backing cards and said fulcrum means.]

[2. A combination as defined in claim 1 including lock-down means cooperating between said receptacle and said backing cards to restrain said backing cards from raising upwardly from their normal operating position and for holding said fulcrum means substantially on said fulcrum line so as to prevent any substantial change in the pressure of contact between said backing cards and said fulcrum means.]

[3. A combination as defined in claim 2 in which said lock-down means comprises flange means extending inwardly from the side wall of said receptacle and notch means formed in said backing card means to receive said flange means.]

[4. A combination as defined in claim 2 in which said backing cards are of substantially rectangular configuration and in which said lock-down means is in the form of flange means extending inwardly from the side walls of said receptacle into notches formed in the side edges of said backing cards, and in which said fulcrum means comprises a plurality of protuberances horizontally arranged along said fulcrum line, said protuberances of adjacent cards being offset to provide for compressibility of the group of backing cards in said receptacle.]

[5. A combination as defined in claim 1 in which said fulcrum means includes a plurality of protuberances extending from said backing cards in substantial horizontal alignment near but spaced from the lower edge of said backing cards and along said fulcrum line, and means for holding said backing cards and said protuberances in contact with each other, and said protuberances acting not only as fulcrum means but also as means for spacing said backing cards to provide a space for receiving a data element, and a data element in one or more of said spaces, each such data element being supported by said data element support means.]

[6. A combination as defined in claim 1 in which said fulcrum means includes a plurality of protuberances extending from said backing cards in substantial horizontal alignment near but spaced from the lower edge of said backing cards and along said fulcrum line, and means for holding said backing cards and said protuberances in contact with each other, said protuberances acting not only as fulcrum means, but also as means for spacing said backing cards to provide a space for receiving a data element, and a data element in one or more said spaces, each such backing card being supported by a backing card support means, and in which said backing card support means extends along the longitudinal side walls of said receptacle and is located at or above the fulcrum line of said fulcrum means and permits said backing cards to pivot or move longitudinally of said receptacle.]

[7. A combination as defined in claim 1 in which said means to position the backing cards, which is element (d) of claim 1 is arranged to converge downwardly and serves as a means for holding said backing cards and fulcrum means in contact while permitting the upper portions of a number of said backing cards to fan outwardly.]

[8. A combination as defined in claim 7 in which said means to position said backing cards and fulcrum means, which is element (d) of claim 1 in contact has converging walls movable into parallel positions to hold the backing cards in vertical arrangement.]

[9. A combination as defined in claim 1 in which said fulcrum means includes a plurality of protuberances extending from said backing cards in substantial horizontal alignment and in which the protuberances of adjacent backing cards are offset from each other whereby a group of backing cards can be compressed in a direction normal to their planes with the individual backing cards flexing under compression.]

[10. A combination as defined in claim 1 in which said backing cards are separated to form spaces therebetween for receiving data elements in such spaces, data elements in one or more of said spaces which rest on said means for supporting said data elements, and data elements gripping means for holding said data element when said backing cards are in fanned relationship.]

[11. A filing system of the class described, the combination of:

a. a file receptacle having spaced apart longitudinal side walls for containing a group of backing cards positioned one behind the other;
b. a plurality of backing cards in said receptacle positioned in side-by-side relationship, one behind the other and having substantially planar bodies and side, bottom and top edges;
c. fulcrum means positioned near the bottom edges of said backing cards and cooperatively engaging between adjacent backing cards contained in said receptacle;
d. backing card support means in said receptacle for supporting said backing cards with said fulcrum means positioned along a fulcrum line which extends from one side of said receptacle to the other;
e. means in said receptacle operating to position said backing cards and said fulcrum means to cause relative pivotal movement of adjacent backing cards about said fulcrum line when a number of said backing cards are caused to converge at their bottom edges and thus cause fanning of a limited number of backing cards; and
f. data element support means for supporting data elements which may be positioned between adjacent backing cards to prevent such data elements from movement into a position between said backing cards and said fulcrum means.]

[12. A combination as defined in claim 11 in which said backing cards are spaced apart to provide a space for receiving data elements between said backing cards, and a data element in one or more of said spaces.]

[13. A combination as defined in claim 12, including means on a forwardly positioned backing card engageable with said data element for holding it against the forward face of a rearwardly positioned backing card.]

[14. A combination as defined in claim 11 in which said backing cards are spaced apart to provide a space for receiving data elements between said backing card, a data element in one or more of said spaces, and means near the top edges of said backing cards for holding said backing cards in spaced relationship when said backing cards are parallel to each other.]

[15. A filing system of the class described, the combination of:

a. a file receptacle having spaced apart longitudinal side walls for containing a group of backing cards positioned one behind the other;
b. a plurality of backing cards supported in said receptacle in side-by-side relationship, one behind the other and having substantially planar bodies and side, bottom and top edges;
c. fulcrum means positioned along a fulcrum line near the bottom edges of said backing cards and cooperatively engaging adjacent backing cards contained in said receptacle;
d. means in said receptacle operating to position said backing cards and said fulcrum means to cause relative pivotal movement of adjacent backing cards about said fulcrum line when a number of said backing cards are caused to converge at their bottom edges and thus cause fanning of a limited number of backing cards;

e. data elements positioned between one or more of said backing cards; and f. means on the back of a forwardly positioned backing card for releasably holding each such data element against a rearwardly positioned backing card, and spaced from the forwardly positioned backing card.]

[16. A filing system of the class described, the combination of:

a. a file receptacle having spaced apart longitudinal side walls for containing a group of backing cards positioned one behind the other;

b. a plurality of backing cards in said receptacle positioned in side-by-side relationship, one behind the other and having substantially planar bodies and side, bottom and top edges;

c. fulcrum means positioned near the bottom edges of said backing cards and cooperatively engaging between adjacent backing cards contained in said receptacle, said fulcrum means holding said backing cards in spaced relation to provide a data element receiving space;

d. means in said receptacle operating to position said backing cards and said fulcrum means to cause relative pivotal movement of adjacent relative pivotal movement of adjacent backing cards about said fulcrum line when a number of said backing cards are caused to converge at their bottom edges and thus cause fanning of a limited number of backing cards;

e. a data element in one or more of said spaces; and f. data element supporting means positioned below said data elements for releasably supporting said data elements to prevent same from moving into a position between said backing cards and said fulcrum means.]

[17. A combination as defined in claim 16 including means for holding each such data element against the forward face of a rearwardly positioned backing card when said backing cards are in fanned relationship.]

[18. A filing system of the class described, the combination of:

a. a file receptacle having spaced apart longitudinal side walls for containing a group of backing cards positioned one behind the other;

b. a plurality of backing cards supported in said receptacle in side-by-side relationship, one behind the other and being spaced apart to provide data element receiving spaces between adjacent backing cards;

c. fulcrum means positioned between said backing cards along a fulcrum line near the bottom edges of said backing cards and cooperatively engaging adjacent backing cards contained in said receptacle;

d. means in said receptacle operating to position said backing cards and said fulcrum means to cause relative pivotal movement of adjacent backing cards about said fulcrum line when a number of said backing cards are caused to converge at their bottom edges and thus cause fanning of a limited number of backing cards;

e. a data element positioned in one or more of said spaces, said data elements having planar bodies; and f. spacer means on the back of a forwardly positioned backing card for forming said space between adjacent backing cards, said spacer means holding said data element against the forward surface of a rearwardly positioned backing card holding such data element spaced from the rearward surface of the forwardly positioned backing card.]

[19. A combination as defined in claim 18 in which said backing cards forming said data elements receiving spaces provide a forward surface and a rearward surface defining each such space, and in which said spacer means comprises protuberances on said rearward surface engageable with said data element and holds such data element against said forward surface and spaced from said rearward surface.]

*20. A file system for supporting removable data elements comprising the combination of:*

*(a) a file receptacle having spaced apart longitudinal sides and having a hold-down portion;*

*(b) a plurality of file backing cards supported in said receptacle, one behind the other, and each card comprising:*

*(1) a sheet having top, bottom, and side edges and front and rear faces;*

*(2) means on one face of said sheet and positioned along a fulcrum line at a location closer to said bottom edge than said top edge and spaced above said bottom edge for separating said one face of said sheet from an adjacent file card, thereby causing fanning apart of said top edges of said sheet and said adjacent file card upon movement of said bottom edges thereof toward one another, the fanning of said cards tending to lift vertically at least one of said cards; and*

*(3) hold-down means formed on said sheet whereby said sheet engages said receptacle hold-down portion thereby constraining the file cards against upward vertical movement during fanning; and*

*(c) means on said receptacle for automatically supporting readily removable data elements positioned between adjacent backing cards to prevent such data elements from movement into a position between said backing cards and said separating means.*

*21. A file system according to claim 20 further comprising means in said receptacle operating to position said backing cards and said separating means to cause relative pivotal movement of adjacent backing cards about said fulcrum line when a number of said backing cards are caused to converge at their bottom edges and thus cause fanning of a limited number of backing cards.*

*22. A file system according to claim 21 wherein said means to position the backing cards comprises front and back walls which are closer together at their bottom than at their top.*

*23. A file system according to claim 21 in which said means to position said backing cards and said separating means has converging walls movable into parallel positions to hold the backing cards in vertical arrangement.*

*24. The file system according to claim 20 wherein said hold-down means holds said backing cards such that said separating means are maintained on said fulcrum line so as to prevent any substantial change in the pressure of contact between said backing cards and said separating means.*

*25. A file system according to claim 20 in which said hold-down portion of said receptacle comprises a flange extending inwardly from the side wall of said receptacle and wherein said hold-down means of said backing card*

*comprises a notch formed in said backing card to receive said flange.*

*26. A file system according to claim 20 wherein said separating means comprises a plurality of protuberances horizontally arranged along said fulcrum line, said protuberances of adjacent cards being offset to provide for compressibility of said plurality of backing cards in said receptacle.*

*27. A file system according to claim 20 wherein said separating means comprise a plurality of protuberances along said fulcrum line, said system further comprising:*

*means for holding said backing cards and said protuberances in contact with each other, said protuberances acting as means for spacing said backing cards to provide a space for receiving a data element, and a data element in one or more of said spaces, each said data element being supported by said means for automatically supporting data elements.*

*28. The file system according to claim 20 in which said means for supporting data elements extends along the longitudinal side walls of said receptacle and is located at or above the fulcrum line of said separating means and permits said backing cards to pivot or move longitudinally of said receptacle.*

*29. A file system according to claim 20 wherein said separating means includes a plurality of protuberances extending from said backing cards in substantial horizontal alignment and in which the protuberances of adjacent backing cards are offset from each other whereby a group of backing cards can be compressed in a direction normal to their plane with the individual backing cards flexing under compression.*

*30. A file system according to claim 20 in which said backing cards include data element gripping means for holding said data element when said backing cards are in fanned relationship.*

*31. A file system according to claim 20 in which said backing cards are spaced apart to provide a space for receiving data elements between said backing cards, said system additionally comprising data elements in one or more said spaces.*

*32. A file system according to claim 31 including means on a forwardly positioned backing card engageable with said data element for holding said data element against the forward face of a rearwardly positioned backing card.*

*33. The file system according to claim 31 including means near the top edges of said backing cards for holding said backing cards in spaced relationship when said backing cards are parallel to each other.*

*34. The file system according to claim 20 including means on the back of a forwardly positioned backing card for releasably holding a data element against a rearwardly positioned backing card, and spaced from the forwardly positioned backing card.*

*35. The file system according to claim 20 wherein said means for supporting data elements comprises a shelf extending longitudinally along said receptacle upon which said data elements rest.*

*36. The file system according to claim 33 in which said means for holding said backing cards in spaced relationship comprises protuberances on the rearward surface of said backing card engageable with said data element, said means holding such data element against the forward surface of a rearward backing card and spaced from said rearward surface of said forward backing card.*

*37. The file system according to claim 20 wherein several of said backing cards abut on one another below said fulcrum line, said abutment limiting the extent to which the top edges of said several cards can be spaced apart, and thereby fanning apart the top edges of said several cards.*

*38. The file system according to claim 20 wherein said separating means comprises a plurality of protuberances integral with said sheet formed along said fulcrum line at a location at or below said hold-down means, and wherein said hold-down means comprises a notch formed in said sheet to engage said hold-down portion of said receptable.*

* * * * *

UNITED STATES PATENT AND TRADEMARK OFFICE

CERTIFICATE OF CORRECTION

PATENT NO. : RE 30,396

DATED : September 9, 1980

INVENTOR(S) : Arthur T. Spees

It is certified that error appears in the above-identified patent and that said Letters Patent are hereby corrected as shown below:

Column 6, line 17, delete "integral with", insert --attached to--.
Column 6, line 24, delete "resiliently flexible", insert --resilient--.
Column 8, line 30, delete "means".
Column 8, line 37, delete "widths", insert --width--.
Column 9, line 16, delete "to", insert --so--.
Column 9, line 23, delete "4", insert --64--.
Column 10, line 22, delete "tile", insert --file--.
Column 11, line 46, delete "enter", insert --center--.
Column 18, line 38, delete "receptable", insert --receptacle--.

Signed and Sealed this

Tenth Day of February 1981

[SEAL]

*Attest:*

RENE D. TEGTMEYER

*Attesting Officer*

*Acting Commissioner of Patents and Trademarks*